US 12,506,404 B2
(12) United States Patent
Da Cunha Alves et al.

(10) Patent No.: US 12,506,404 B2
(45) Date of Patent: Dec. 23, 2025

(54) ACTIVE VOLTAGE SNUBBER AND VOLTAGE CONVERTER

(71) Applicant: Valeo eAutomotive France SAS, Cergy (FR)

(72) Inventors: Wendell Da Cunha Alves, Cergy (FR); Massourang Diallo, Cergy (FR); Maxime Moreau, Cergy (FR)

(73) Assignee: Valeo eAutomotive France SAS, Cergy (FR)

( * ) Notice: Subject to any disclaimer, the term of this patent is extended or adjusted under 35 U.S.C. 154(b) by 337 days.

(21) Appl. No.: 18/172,696

(22) Filed: Feb. 22, 2023

(65) Prior Publication Data

US 2023/0268824 A1    Aug. 24, 2023

(30) Foreign Application Priority Data

Feb. 22, 2022    (FR) ..................................... 22 01538

(51) Int. Cl.
*H02M 1/34* (2007.01)
*H02M 1/00* (2007.01)
*H02M 3/335* (2006.01)

(52) U.S. Cl.
CPC ......... *H02M 1/342* (2021.05); *H02M 1/0006* (2021.05); *H02M 3/33592* (2013.01)

(58) Field of Classification Search
CPC ......... H02M 1/0006; H02M 1/34–348; H02M 3/335–33592
See application file for complete search history.

(56) References Cited

U.S. PATENT DOCUMENTS 5,898,581 A    4/1999  Liu
6,128,206 A *  10/2000 Sun ................... H02M 3/33592
                                                363/127

(Continued)

FOREIGN PATENT DOCUMENTS

CN          110557003 A    12/2019
WO    WO 2018/046755 A1    3/2018

OTHER PUBLICATIONS

French Preliminary Search Report & Written Opinion Issued Sep. 30, 2022 in French Application 22 01538 filed on Feb. 22, 2022 (with English Translation of Categories of Cited Documents), 10 pages.

(Continued)

*Primary Examiner* — Fred E Finch, III
(74) *Attorney, Agent, or Firm* — Oblon, McClelland, Maier & Neustadt, L.L.P.

(57) ABSTRACT

An active voltage snubber includes a ground terminal and an input terminal, and a snubber capacitor. A snubbing-activation device is designed to connect the input terminal to a second terminal of the snubber capacitor with a view to charging the snubber capacitor via this second terminal. Also included is a discharging switch for discharging the snubber capacitor, and a control circuit for controlling the discharging switch, which is designed to close the discharging switch so as to make the snubber capacitor discharge via its second terminal through the discharging switch. The control circuit is powered electrically by the snubber capacitor by being connected to the second terminal of the snubber capacitor so as to receive current from the snubber capacitor.

18 Claims, 4 Drawing Sheets

(56) References Cited

U.S. PATENT DOCUMENTS

| | | | |
|---|---|---|---|
| 9,705,415 B2 | 7/2017 | Wong et al. | |
| 10,340,802 B1* | 7/2019 | Ke | H02M 1/34 |
| 2006/0268585 A1* | 11/2006 | Domb | H02M 3/33592 |
| | | | 363/21.06 |
| 2009/0225574 A1* | 9/2009 | Fornage | H02M 3/335 |
| | | | 363/123 |
| 2011/0157941 A1* | 6/2011 | Yedevelly | H02M 3/33507 |
| | | | 363/126 |
| 2013/0107582 A1* | 5/2013 | Sato | H02M 3/33592 |
| | | | 363/21.06 |
| 2014/0133200 A1* | 5/2014 | Sun | H02M 1/34 |
| | | | 363/50 |
| 2015/0381075 A1 | 12/2015 | Qu et al. | |
| 2017/0025968 A1* | 1/2017 | Wong | H02M 3/33592 |
| 2017/0033703 A1 | 2/2017 | Kikuchi et al. | |
| 2017/0063240 A1 | 3/2017 | Kumar et al. | |
| 2017/0310226 A1* | 10/2017 | Cheng | H02M 1/36 |
| 2019/0044449 A1* | 2/2019 | Li | H02M 1/08 |
| 2021/0143730 A1* | 5/2021 | Yang | H02M 3/33507 |

OTHER PUBLICATIONS

European Office Action issued Mar. 20, 2025, in corresponding European Patent Application No. 23 157 832.9, 8 pages.

\* cited by examiner

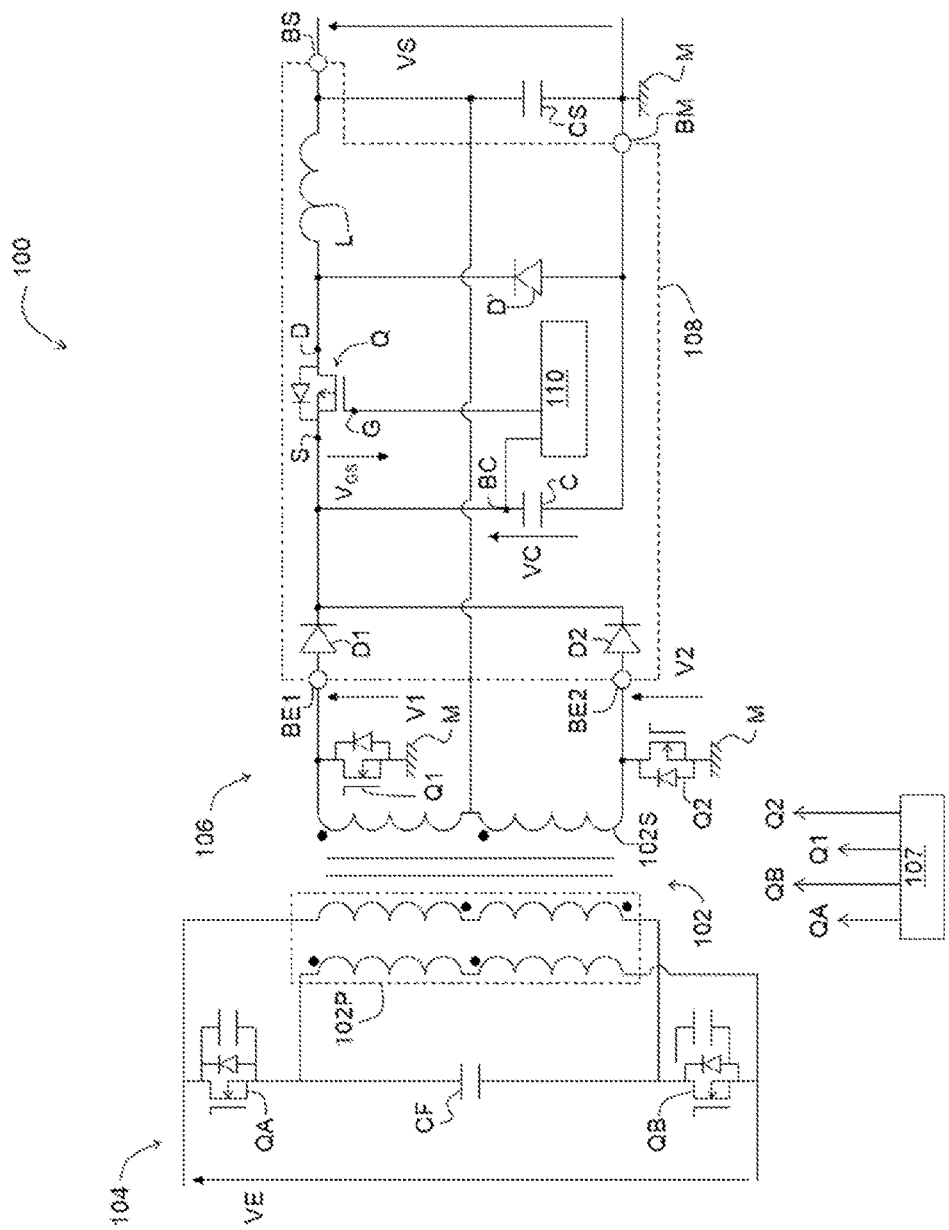
[Fig. 1]

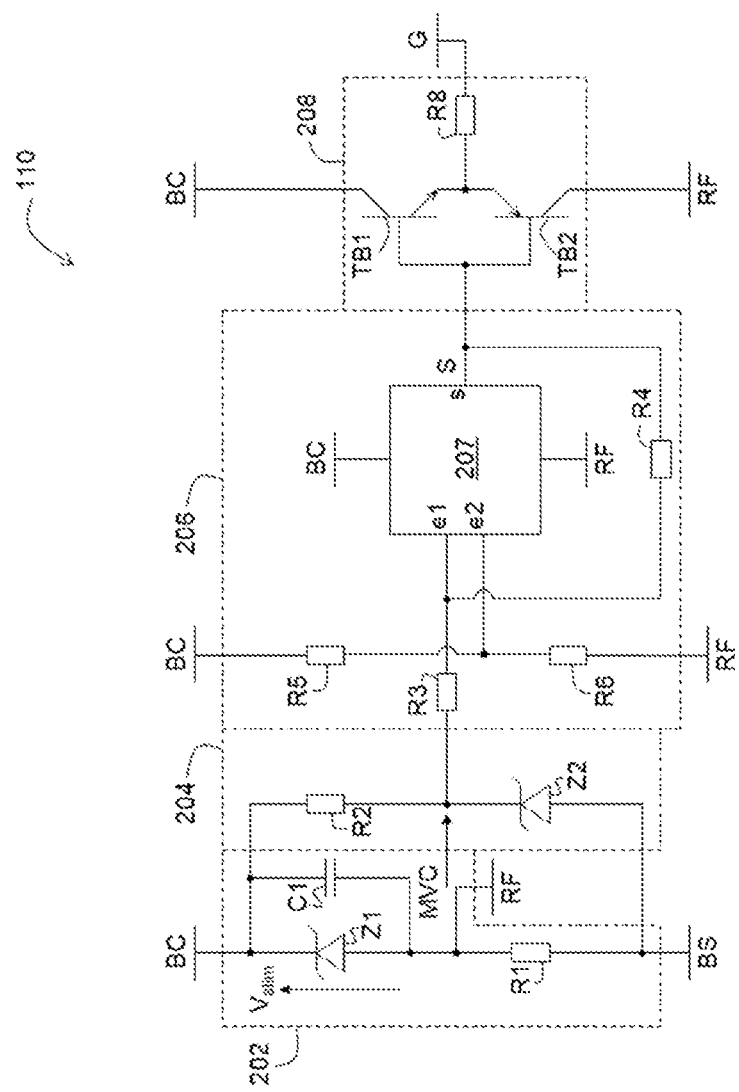
[Fig. 2]

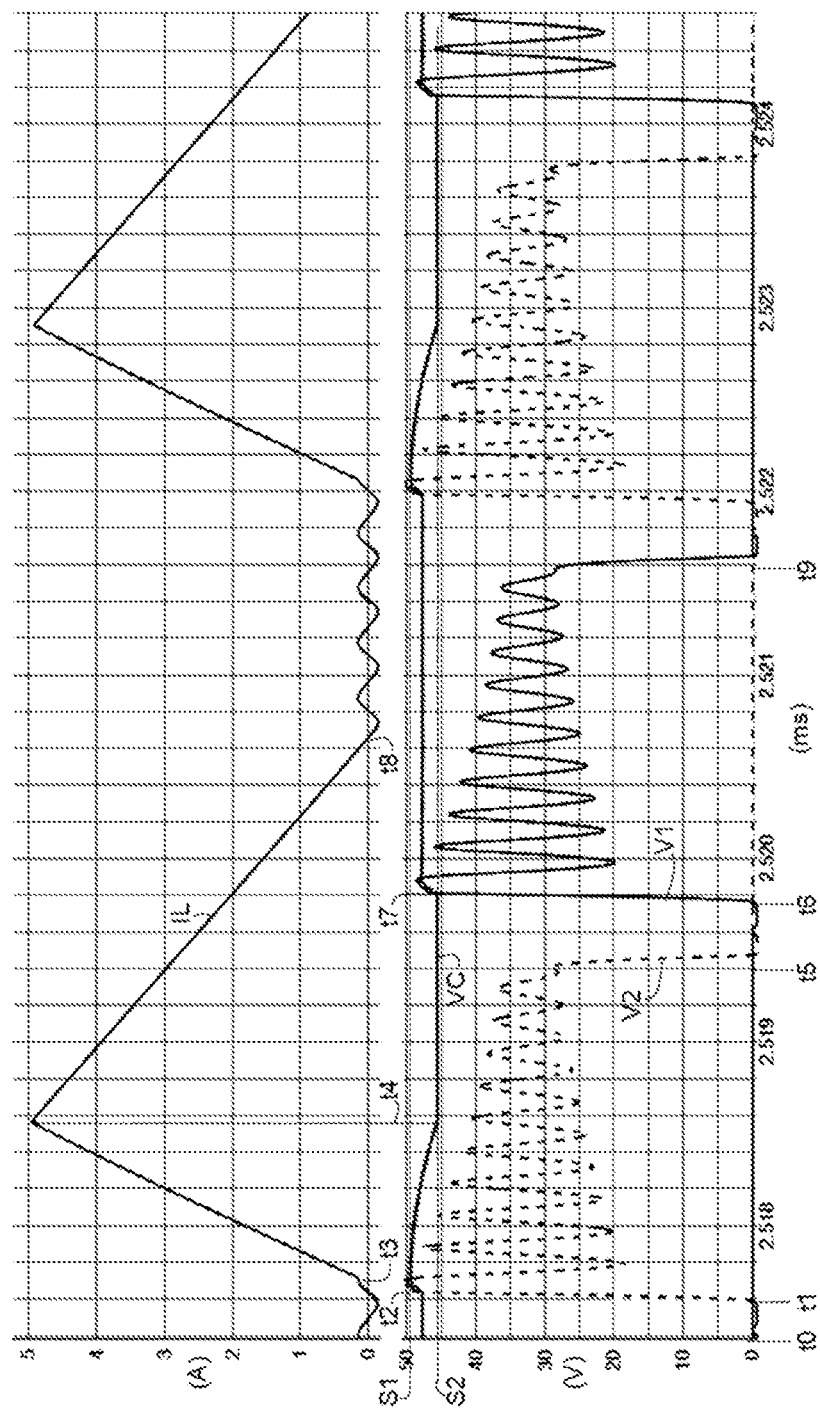
[Fig. 3]

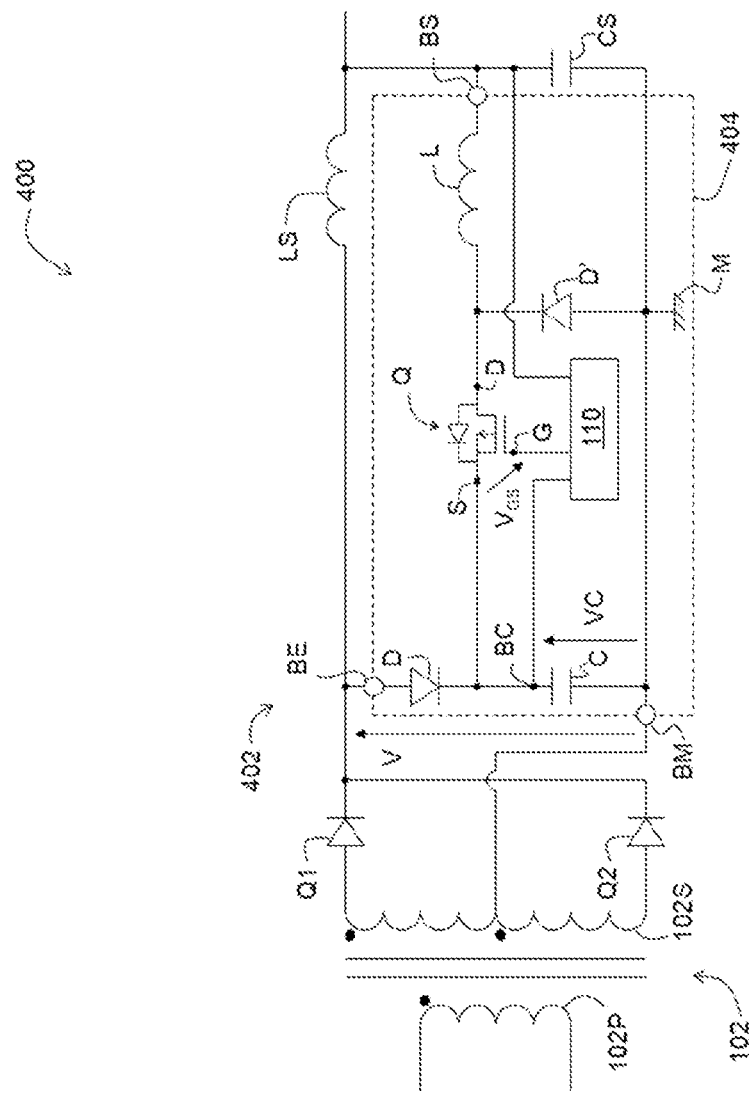
[Fig. 4]

ACTIVE VOLTAGE SNUBBER AND VOLTAGE CONVERTER

TECHNICAL FIELD OF THE INVENTION

The present invention relates to an active voltage snubber, and to a voltage converter.

TECHNOLOGICAL BACKGROUND

The United States patent published under number U.S. Pat. No. 5,898,581 describes an active voltage snubber of the type comprising:
- a ground terminal and an input terminal that is designed to receive an input voltage with respect to the ground terminal;
- a snubber capacitor having a first terminal connected to the ground terminal;
- a snubbing-activation device designed to connect the input terminal to a second terminal of the snubber capacitor when the input voltage delivered to this input terminal reaches a certain threshold, with a view to charging the snubber capacitor via this second terminal;
- a switch for discharging the snubber capacitor, this discharging switch being connected to the second terminal of the snubber capacitor; and
- a control circuit for controlling the discharging switch, which control circuit is designed to close the discharging switch so as to make the snubber capacitor discharge via its second terminal through the discharging switch.

In this prior-art active snubber, the discharging switch is controlled by a control unit of the converter to which the active snubber belongs. It is therefore necessary to run interconnects between said control unit and this discharging switch, this potentially making it more complex to route the connections of the converter and generating an additional cost.

It would thus be desirable to provide an active voltage snubber allowing the discharging switch to be controlled straight-forwardly.

SUMMARY OF THE INVENTION

An active voltage snubber of the aforementioned type is therefore proposed that is characterized in that the control circuit is powered electrically by the snubber capacitor by being connected to the second terminal of the snubber capacitor so as to receive current from the snubber capacitor.

By virtue of the invention, the control circuit does not require an external power supply. The control circuit is thus stand-alone.

Optionally, the control circuit comprises a comparator circuit designed to compare a voltage held by the snubber capacitor with at least one threshold, the control circuit being designed to control the discharging switch depending on the comparison.

Thus, because the comparison function may be performed straight-forwardly in an analogue manner, the control circuit may take a simple form, not requiring processing to be performed by a microprocessor.

Also optionally, the at least one threshold comprises a first threshold and a second threshold lower than the first, and the control circuit is designed to close the discharging switch when the voltage of the snubber capacitor reaches the first threshold and to open the discharging switch when the voltage of the snubber capacitor reaches the second threshold.

Thus, because of the hysteresis, it is possible to control the discharging switch without a fixed clock. Specifically, the hysteresis forms an imitation clock (of variable frequency).

Also optionally, the control circuit comprises a supply circuit designed to deliver, from the snubber capacitor, a supply voltage to the comparator circuit.

Such a supply voltage makes it possible to power the conventional electrical components, such as an operational amplifier, allowing the comparison function to be performed.

The control circuit may be connected between the second terminal of the snubber capacitor and an output terminal, this output terminal being connected to an output capacitor, this output capacitor being connected between the output terminal and the ground terminal.

This supply voltage is for example delivered across the second terminal of the snubber capacitor and a floating reference terminal of the supply circuit.

Also optionally, the discharging switch has a current-input terminal connected to the second terminal of the snubber capacitor and the control circuit is designed to control the discharging switch via a control voltage applied across a control terminal of the discharging switch and its current-input terminal.

Specifically, in U.S. Pat. No. 5,898,581, the switch is an n-channel insulated-gate field-effect transistor and hence it is controlled by a voltage across its control terminal and its current-output terminal. Thus, when the switch is open, the current-output terminal is at a floating potential, and hence it is necessary to use an isolated driver to control it. In this implementation of the invention, because the current-input terminal has a set voltage, it is possible to control the switch straight-forwardly, without an isolated driver.

Also optionally, the at least one input terminal comprises two input terminals.

Also optionally, the snubbing-activation device comprises, for each input terminal, a diode having an anode connected to this input terminal and a cathode connected to the second terminal of the snubber capacitor.

Thus, the snubbing-activation device may be produced straight-forwardly using conventional electrical components.

Also optionally, the active voltage snubber further comprises an inductor connected to a current-output terminal of the discharging switch.

Thus, because of the inductor, the current discharged may be limited.

A DC-DC voltage converter is also proposed, this converter comprising:
- a voltage rectifier comprising at least one switch; especially two switches, and
- an active voltage snubber according to the invention, each switch being connected between a respective input terminal and the ground terminal of the active voltage snubber.

Optionally, the DC-DC voltage converter further comprises:
- a transformer providing galvanic isolation;
- a DC-AC converter connected to a primary of the transformer;
and the rectifier is connected to a secondary of the transformer.

A motor vehicle is also proposed, this motor vehicle comprising:

first and second batteries; and a DC-DC voltage converter according to the invention, connected between the first and second batteries.

BRIEF DESCRIPTION OF THE FIGURES

The invention will be better understood on reading the following description, which is given solely by way of example and with reference to the appended drawings, in which:

FIG. 1 is a simplified circuit diagram of a first example of a voltage converter according to the invention, FIG. 2 is a simplified circuit diagram of a control circuit of the voltage converter of FIG. 1, FIG. 3 shows timing diagrams of electrical quantities of the voltage converter of FIG. 1, and FIG. 4 is a simplified circuit diagram of a second example of a voltage converter according to the invention.

DETAILED DESCRIPTION OF THE INVENTION

With reference to FIG. 1, a first example of a voltage converter 100 according to the invention will now be described.

For example, the voltage converter 100 is an isolated DC-DC converter, such as a "flyward" converter, as for example described in detail in the French patent application published under number FR 3 056 038 A1.

The voltage converter 100 is for example employed in a motor vehicle to connect, to each other, two batteries of the motor vehicle that have different voltages. The battery of higher voltage, which is referred to as the HV battery, HV standing for "high-voltage", is generally used to power a traction system of the motor vehicle. Its nominal voltage may be comprised between 400 V and 800 V. The battery of lower voltage, which is referred to as the LV battery, LV standing for "low-voltage", is generally used to power accessories of the motor vehicle (headlamps, radio, on-board computer, heated seats, etc.) and its nominal voltage may be comprised between 10 V and 50 V, 12 V for example.

The voltage converter 100 firstly comprises a transformer 102 providing galvanic isolation.

The voltage converter 100 further comprises a DC-AC converter 104 connected to a primary 102P of the transformer 102.

The DC-AC converter 104 for example comprises two controllable switches QA, QB. Preferably, each of them comprises a semiconductor switch, for example a transistor such as a metal-oxide-semiconductor field-effect transistor (MOSFET) or indeed an insulated-gate bipolar transistor (IGBT).

The DC-AC converter 104 further comprises for example a capacitor CF connected between the two controllable switches QA, QB. A DC input voltage VE is thus intended to be received across the terminals of the assembly made up of the switches QA, QB and of the capacitor CF.

The voltage converter 100 further comprises a voltage rectifier 106 connected to a secondary 102S of the transformer 102.

The voltage rectifier 106 comprises two switches Q1, Q2. Preferably, each of them is controllable and comprises a semiconductor switch, for example a transistor such as a MOSFET or indeed an IGBT. Each controllable switch Q1, Q2 is connected between a respective end of the secondary 102S of the transformer 102 and an electrical ground M. The controllable switches Q1, Q2 are thus designed to hold voltages V1, V2, respectively.

Alternatively, the switches Q1, Q2 could be two diodes, respectively.

The voltage rectifier 106 further comprises an output capacitor CS connected between the electrical ground M and a mid-point of the secondary 102S of the transformer 102. The output capacitor CS is thus designed to hold a DC output voltage VS.

The voltage converter 100 further comprises a control device 107 for controlling the switches QA, QB, Q1, Q2. In particular, the control device 107 may be designed to control the switches Q1, Q2 in opposition with a duty cycle of 50% (and with an optional dead time).

The voltage converter 100 further comprises an active voltage snubber 108 designed to snub the voltages V1, V2, i.e. to limit the value thereof.

To do this, the active voltage snubber 108 firstly comprises two input terminals BE1, BE2, which for example are connected between the ends of the secondary 102S of the transformer 102 and the controllable switches Q1, Q2, respectively, with a view to receiving the voltages V1, V2, respectively. The active voltage snubber 108 further comprises a ground terminal BM connected to the ground M of the voltage converter 100 and an output terminal BS connected to the output capacitor CS.

The active voltage snubber 108 further comprises a snubber capacitor C having a first terminal connected to the ground terminal BM. This snubber capacitor C is designed to hold a capacitor voltage VC.

The active voltage snubber 108 further comprises a snubbing-activation device designed to connect a second terminal BC of the snubber capacitor C to the input terminal BE1 and to the input terminal BE2, respectively, when the voltage V1 reaches a certain threshold and when the voltage V2 reaches a certain threshold, respectively.

The snubbing-activation device may for example comprise two diodes D1, D2 each having an anode connected to the respective input terminal BE1, BE2 and a cathode connected to the second terminal BC of the snubber capacitor C. Thus, assuming the diodes D1, D2 to be ideal, the diode D1 turns on and the diode D2 turns on when the voltage V1 reaches the capacitor voltage VC and when the voltage V2 reaches the capacitor voltage VC, respectively. The snubber capacitor C is then charged through this diode D1 and this diode D2, respectively.

The active voltage snubber 108 further comprises a discharging switch Q for discharging the snubber capacitor C. The discharging switch Q is controllable and designed to allow, when closed, the snubber capacitor C to be discharged, in particular to the output capacitor CS. Preferably, the discharging switch Q is a semiconductor switch, for example a transistor such as a MOSFET or indeed an IGBT.

The discharging switch Q has a current-input terminal S connected to the second terminal BC of the snubber capacitor C, a current-output terminal D and a control terminal G. The discharging switch Q is designed to be controlled by a control voltage $V_{GS}$ applied between its control terminal G and its current-input terminal S.

For example, the discharging switch Q comprises a p-channel MOSFET. Thus, the terminals S, D, G comprise a source, a drain and a gate of this MOSFET, respectively. Furthermore, again by way of example, the discharging switch Q is open when the voltage $V_{GS}$ is substantially zero and closed when the voltage $V_{GS}$ is negative, for example lower than −4 V.

The active voltage snubber 108 further comprises a component connected between the current-output terminal D of the discharging switch Q and the output terminal BS. Thus, when the discharging switch Q is closed, the snubber capacitor C discharges to the output terminal BS through this component. The presence of this component thus allows the snubber capacitor C to be connected to the capacitor CS even though the voltage VC may be higher, in practice up to three times higher, than the voltage VS. Preferably, this component is an inductor L, which has the advantage of allowing the current flowing from the snubber capacitor C to the output terminal BS to be limited. Specifically, as will be explained below, on closure of the discharging switch Q, the inductor passes a current that increases substantially linearly.

The active voltage snubber 108 further comprises a flyback diode D' having an anode connected to the ground terminal BM and a cathode connected between the controllable switch and the inductor L. This flyback diode D' is designed to allow current to continue to pass through the inductor L when the discharging switch Q is open.

The discharging switch Q, the inductor L and the flyback diode D' may thus be considered to be a DC-DC converter that converts the voltage VC of the snubber capacitor C into the output voltage VS.

The active voltage snubber 108 further comprises a control circuit 110 for controlling the discharging switch Q. The control circuit 110 is connected to the control terminal G and to the current-input terminal S of the discharging switch Q in order to deliver the control voltage $V_{GS}$. The control circuit 110 may further be connected to the output terminal BS, as illustrated in FIG. 2.

As the current-input terminal S of the discharging switch Q and the terminal BC of the snubber capacitor C are connected to each other, the control circuit 110 is also connected to the terminal BC of the snubber capacitor C. As will be explained in more detail below, the control circuit 110 receives current from the snubber capacitor C via the terminal BC, in order to be powered electrically by the snubber capacitor C. This allows the control circuit 110 to be stand-alone, i.e. not to require an external power supply.

With reference to FIG. 2, one example of a control circuit 110 will now be described in more detail.

The control circuit 110 firstly comprises a supply circuit 202 designed to deliver a DC supply voltage $V_{alim}$. This supply voltage $V_{alim}$ may for example be obtained from a voltage present across the capacitor terminal BC and the output terminal BS. In the described example, the supply voltage $V_{alim}$ is delivered across the capacitor terminal BC and a floating reference terminal RF of the supply circuit 202.

The supply circuit 202 may further comprise a Zener diode Z1 and a capacitor C1 that are connected in parallel with each other. These two components Z1, C1 are for example connected between the capacitor terminal BC and the floating reference terminal RF. Le supply circuit 202 may further comprise a resistor R1 connected between the floating reference terminal RF and the output terminal BS. The Zener diode Z1 has a Zener voltage, to which the supply voltage $V_{alim}$ is substantially equal, and which is smoothed by the capacitor C1. Association of the Zener diode Z1 with the resistor R1 allows the floating reference terminal RF to be obtained.

The control circuit 110 further comprises a measuring circuit 204 for measuring the capacitor voltage VC.

In the described example, the measuring circuit 204 comprises a resistor R2 and a Zener diode Z2 that are connected to each other in series between the capacitor terminal BC and the output terminal BS. Thus, the resistor R2 and the Zener diode Z2 are connected to each other at a mid-point having, with respect to the floating reference RF, a voltage MVC equal to:

$$MVC = V_{alim} - VC + VS - Uz \quad \text{[Math. 1]}$$

where Uz is a Zener voltage of the Zener diode Z2.

Thus, as the supply voltage $V_{alim}$, the output voltage VS and the Zener voltage of the Zener diode Z2 are substantially constant, the voltage MVC is indeed representative of the voltage VC and therefore provides a measurement of this voltage VC.

The control circuit 110 further comprises a comparator circuit 206 designed to receive the measurement MVC and, on the basis of the latter, to compare the voltage VC of the snubber capacitor C with at least one threshold. The comparator circuit 206 is further designed to deliver a control signal S for controlling the discharging switch Q, depending on the comparison.

Preferably, the comparator circuit 206 employs hysteresis. In this case, it may be designed to deliver the control signal S having a value such as to close the discharging switch Q when the voltage VC of the snubber capacitor C increases to reach a first threshold S1, and to deliver the control signal S having a value such as to open the discharging switch Q when the voltage VC of the snubber capacitor C decreases to reach a second threshold S2, lower than the first threshold S1.

For example, the value at which the discharging switch Q closes corresponds to the voltage $V_{alim}$ with respect to the floating reference terminal RF, whereas the value at which the discharging switch Q opens corresponds to 0 V with respect to the floating reference terminal RF.

Thus, because of the hysteresis, it is possible to control the discharging switch without a fixed clock. Specifically, the hysteresis forms an imitation clock (of variable frequency). With the fact that the discharging switch Q is controlled between the terminals G, S, the absence of a clock allow the control circuit 110 to be produced very straight-forwardly.

To achieve the hysteresis, the comparator circuit 206 for example comprises a simple comparator circuit 207 (for example an integrated analogue circuit such as an operational amplifier) connected between the terminals BC and RF, with a view to having it powered by the supply voltage $V_{alim}$. The simple comparator circuit 207 has two inputs e1, e2 and an output s designed to deliver the control signal S. The control signal is defined depending on the comparison between the voltages on the inputs e1, e2. To apply a reference REF to the input e2, the comparator circuit 206 may comprise two resistors R5, R6 in series with each other between the capacitor terminal BC and the floating reference terminal RF in order to form a voltage divider at their mid-point, which is connected to the input e2. The comparator circuit 206 may further comprise two resistors R3, R4 in series with each other between, on the one hand, a mid-point between the resistor R2 and the Zener diode Z2 and, on the other hand, the output s. These resistors R3, R4 thus form a voltage divider at their mid-point, which is connected to the input e1. Thus, the voltage on the input e1 depends both on the measurement MVC and on the control signal S, this allowing the hysteresis to be created.

The control circuit 110 further comprises a current-amplifying circuit 208 connected between the output s of the comparator circuit 206 and the control terminal G of the discharging switch Q.

In the described example, the current-amplifying circuit 208 comprises two bipolar transistors TB1, TB2, of NPN and PNP type respectively, connected in series with each other between the capacitor terminal BC and the floating reference terminal RF. The bipolar transistors TB1, TB2 have respective bases that are both connected to the output s of the comparator circuit to receive the control signal S. The current-amplifying circuit 208 further comprises a resistor R8 connected between a mid-point of the bipolar transistors TB1, TB2 and the control terminal G of the discharging switch Q.

With reference to FIG. 3, one example of operation of the active voltage snubber 108 will now be described.

Initially, at a time t0, the two switches Q1, Q2 are closed, and hence the voltages V1, V2 are zero. The diodes D1, D2 are turned off and the current IL is substantially zero.

At a time t1, the control device 107 opens the switch Q2. The voltage V2 then increases to a final value. Since the diodes D1, D2 are turned off, the snubber capacitor C is not charged and hence the voltage V2 increases rapidly. Because of the presence of parasitic capacitances and inductances, this sudden increase leads to the appearance of oscillations about the final value.

At a time t2, while the voltage V2 is in the rising part of the first oscillation, the voltage V2 reaches the capacitor voltage VC and the diode D2 turns on to charge the snubber capacitor C, this limiting the increase in the voltage V2. The voltage VC then increases with the voltage V2.

At a time t3, the control device 110 detects that the voltage VC has reached the first threshold S1 and, in response, closes the discharging switch Q. The snubber capacitor C then discharges through the inductor L, this causing an increasing current IL to appear. The current IL increases substantially linearly because the voltage VC and the output voltage VS are substantially constant, and hence the voltage across the terminals of the inductor L is substantially constant.

The voltage V2 is then in the falling part of the first oscillation and therefore drops below the voltage VC and hence the diode D2 once again turns off. The following oscillations are for example of smaller amplitude than the first oscillation and hence the voltage V2 remains below the voltage VC.

At the time t4, the control device 110 detects that the voltage VC has reached the second threshold S2 and, in response, opens the discharging switch Q. The snubber capacitor C then ceases to discharge, and hence its voltage VC remains constant at the threshold S2. Moreover, the inductor L is connected to the electrical ground M through the diode D', which turns on. The current IL is delivered through the diode D' and decreases.

At a time t5, the control device 107 closes the switch Q2, and hence the voltage V2 decreases to zero.

At a time t6, the control device 107 opens the switch Q1. The voltage V1 then increases to a final value. Since the diodes D1, D2 are turned off, the snubber capacitor C is not charged and hence the voltage V1 increases rapidly. Because of the presence of parasitic capacitances and inductances, this sudden increase leads to the appearance of oscillations about the final value.

At a time t7, while the voltage V1 is in the rising part of the first oscillation, the voltage V1 reaches the capacitor voltage VC and the diode D1 turns on to charge the snubber capacitor C, this limiting the increase in the voltage V1. The voltage VC then increases with the voltage V1, until the falling part of the first oscillation is reached. The voltage V1 then drops below the voltage VC and hence the diode D1 once again turns off. The following oscillations are, in the described example, of smaller amplitude than the first oscillation and hence the voltage V1 remains below the voltage VC. Thus, generally, the threshold S1 is not necessarily reached each time switching occurs. Switching may need to occur a plurality of times before it is reached. In the described example, the threshold S1 is reached every two switches (switching of Q1 and switching of Q2).

At a time t8, the inductor current IL reaches zero.

At a time t9, the control device 107 closes the switch Q1, and hence the voltage V1 decreases to zero.

The active voltage snubber 108 is then back in a state identical to the initial state t0 and the steps described above are repeated.

With reference to FIG. 4, another example of a voltage converter 400 according to the invention will now be described.

In FIG. 4, the DC-AC converter connected to the primary 102P of the transformer 102 has not been shown. It could be like the one shown in FIG. 1, or indeed be different.

The switches Q1, Q2 are diodes this time. Thus, the switches Q1, Q2 are not controllable, but switch depending on the state of the voltage converter.

The rectifier, designated by the reference 402, further comprises an output inductor LS connected between the switches Q1, Q2 and the output capacitor CS.

Furthermore, the active voltage snubber, designated by the reference 404, is the same as that of FIG. 1, except that it comprises a single input terminal BE connected to the two switches Q1, Q2 and that the snubbing-activation device comprises a single diode D having an anode connected to the input terminal BE and a cathode connected to the snubber capacitor C.

Furthermore, the ground terminal BM is connected to the mid-point of the secondary 102S of the transformer 102.

Thus, an input voltage V is present across the input terminal BE and the ground terminal BM, and the active voltage snubber 404 allows it to be snubbed, thus protecting the diodes Q1, Q2.

It should be clearly apparent that an active voltage snubber such as described above allows control of the switch of the active voltage snubber to be simplified.

It will moreover be noted that the invention is not limited to the embodiments described above. Specifically, it will be clear to those skilled in the art that various modifications may be made to the embodiments described above, in the light of the teaching that has just been disclosed to them.

In the detailed presentation of the invention that was given above, the terms that were used must not be understood as limiting the invention to the embodiments disclosed in the present description, but must be understood as including all equivalents, the anticipation of which is within the scope of a person skilled in the art applying their general knowledge to the implementation of the teaching that has just been disclosed to them.

The invention claimed is:

1. An active voltage snubber comprising:
   a ground terminal and an input terminal configured to receive an input voltage with respect to the ground terminal;
   a snubber capacitor having a first terminal connected to the ground terminal;
   a snubbing-activation device configured to connect the input terminal to a second terminal of the snubber capacitor when the input voltage delivered to the input terminal reaches a certain threshold, thereby charging the snubber capacitor via the second terminal;

a discharging switch for discharging the snubber capacitor, the discharging switch being connected to the second terminal of the snubber capacitor; and a control circuit for controlling the discharging switch, which control circuit is configured to close the discharging switch so as to make the snubber capacitor discharge via the second terminal through the discharging switch;

wherein the control circuit is powered electrically by the snubber capacitor by being connected to the second terminal of the snubber capacitor so as to receive current from the snubber capacitor, and wherein the control circuit is connected between the second terminal of the snubber capacitor and an output terminal, the output terminal being connected to an output capacitor, the output capacitor being connected between the output terminal and the ground terminal, and wherein the discharging switch is configured to allow, when closed, the snubber capacitor to be discharged to the output capacitor.

2. The active voltage snubber according to claim 1, wherein the control circuit comprises a comparator circuit configured to compare a voltage held by the snubber capacitor with at least one threshold, the control circuit being configured to control the discharging switch depending on the comparison.

3. The active voltage snubber according to claim 2, wherein the at least one threshold comprises a first threshold and a second threshold lower than the first threshold, and wherein the control circuit is configured to close the discharging switch when the voltage of the snubber capacitor reaches the first threshold and to open the discharging switch when the voltage of the snubber capacitor reaches the second threshold.

4. The active voltage snubber according to claim 3, wherein the control circuit comprises a supply circuit configured to deliver, from the snubber capacitor, a supply voltage to the comparator circuit.

5. The active voltage snubber according to claim 4, wherein the supply voltage is delivered across the second terminal of the snubber capacitor and a floating reference terminal of the supply circuit.

6. The active voltage snubber according to claim 3, wherein the discharging switch has a current-input terminal connected to the second terminal of the snubber capacitor and wherein the control circuit is configured to control the discharging switch via a control voltage applied across a control terminal of the discharging switch and the current-input terminal.

7. The active voltage snubber according to claim 3, wherein the input terminal comprises two input terminals.

8. The active voltage snubber according to claim 2, wherein the discharging switch has a current-input terminal connected to the second terminal of the snubber capacitor and wherein the control circuit is configured to control the discharging switch via a control voltage applied across a control terminal of the discharging switch and the current-input terminal.

9. The active voltage snubber according to claim 2, wherein the input terminal comprises two input terminals.

10. The active voltage snubber according to claim 2, wherein the snubbing-activation device comprises, for each input terminal, a diode having an anode connected to the input terminal and a cathode connected to the second terminal of the snubber capacitor.

11. The active voltage snubber according to claim 2, further comprising an inductor connected to a current-output terminal of the discharging switch.

12. A DC-DC voltage converter, comprising:
a voltage rectifier comprising a switch; and
an active voltage snubber according to claim 2, the switch being connected between the input terminal and the ground terminal of the active voltage snubber.

13. The active voltage snubber according to claim 1, wherein the discharging switch has a current-input terminal connected to the second terminal of the snubber capacitor and wherein the control circuit is configured to control the discharging switch via a control voltage applied across a control terminal of the discharging switch and the current-input terminal.

14. The active voltage snubber according to claim 1, wherein the input terminal comprises two input terminals.

15. The active voltage snubber according to claim 1, wherein the snubbing-activation device comprises, for each input terminal, a diode having an anode connected to the input terminal and a cathode connected to the second terminal of the snubber capacitor.

16. The active voltage snubber according to claim 1, further comprising an inductor connected to a current-output terminal of the discharging switch.

17. A DC-DC voltage converter, comprising:
a voltage rectifier comprising a switch; and
an active voltage snubber according to claim 1, the switch being connected between the input terminal and the ground terminal of the active voltage snubber.

18. The DC-DC voltage converter according to claim 17, further comprising:
a transformer providing galvanic isolation;
a DC-AC converter connected to a primary of the transformer;
and wherein the rectifier is connected to a secondary of the transformer.

* * * * *